March 14, 1967  C. O. DAVIDSON  3,308,613

NUT GATHERING APPARATUS

Filed March 10, 1964  2 Sheets-Sheet 1

INVENTOR.
CLARENCE O. DAVIDSON
BY
Townsend and Townsend
ATTORNEYS

March 14, 1967 — C. O. DAVIDSON — 3,308,613
NUT GATHERING APPARATUS
Filed March 10, 1964 — 2 Sheets-Sheet 2

INVENTOR.
CLARENCE O. DAVIDSON
BY
Townsend and Townsend
ATTORNEYS

United States Patent Office 3,308,613
Patented Mar. 14, 1967

3,308,613
NUT GATHERING APPARATUS
Clarence Orden Davidson, Rte. 1, Box 905,
Lakeport, Calif. 95453
Filed Mar. 10, 1964, Ser. No. 350,778
4 Claims. (Cl. 56—328)

This invention relates to apparatus movable over a ground surface for gathering nuts lying on the ground surface that have fallen from trees growing on the surface.

Prior art nut gathering machines of which I have knowledge are large and cumbersome, and require consumption of large amounts of power for their operation. Such machines are so large that they do not operate well on uneven terrain and are incapable of close approach to tree trunks.

Therefore, it is an object of the present invention to provide apparatus for gathering nuts from a ground surface which apparatus is so light and compact that it can be easily controlled by one man walking behind the apparatus.

Another object of the present invention is to provide such apparatus that is capable of gathering nuts from ground surface areas immediately adjacent tree trunks. Attainment of this object is made possible by constructing a machine according to the present invention wherein a device for picking up nuts from the ground is located at the forward extremity of the machine and wherein the machine is so balanced that the forward end of the machine can be readily guided near tree trunks.

A feature and advantage of the present invention is that it is balanced to afford one man operation. Such feature and advantage is achieved by mounting a pair of wheels near the central portion of a frame, mounting an engine on one end of the frame and nut picking-up apparatus at the other end of the frame, and by providing a nut receiving receptacle in the center of the frame symmetrical with respect to the wheels. Thus the quantity of nuts gathered will not influence the balance of the machine.

Another feature and advantage of the present invention is that gathered walnuts can be easily and rapidly unloaded from the machine. This feature and advantage is secured by providing nut receiving receptacles in an unobstructed portion of the frame. Thus the receptacles can be lifted straight up and dumped into a suitable repository.

A further feature and advantage of the present invention is that the apparatus is adaptable for use over relatively rough terrain. Such feature and advantage arises from the fact that all ground surface contacting parts are made of resilient material so as to yield when the machine is moved over a projection or obstruction upon the ground surface.

A still further feature and advantage of the present invention is that the tires on which the apparatus is supported for movement over the ground are sufficiently broad that they can be operated at a very low pressure to the end that the tires can be rolled over nuts lying on the ground without breaking the nuts or pressing them into the ground surface. Such feature and advantage is especially important when the ground has been softened by heavy rains. Because no prior art device of which I am aware possesses this feature and advantage the supporting wheels of such devices must be within the swath of the device as a consequence of which the width of such device is limited.

These and other objects will be more apparent after referring to the following specification and accompanying drawings in which.

Figure 1:
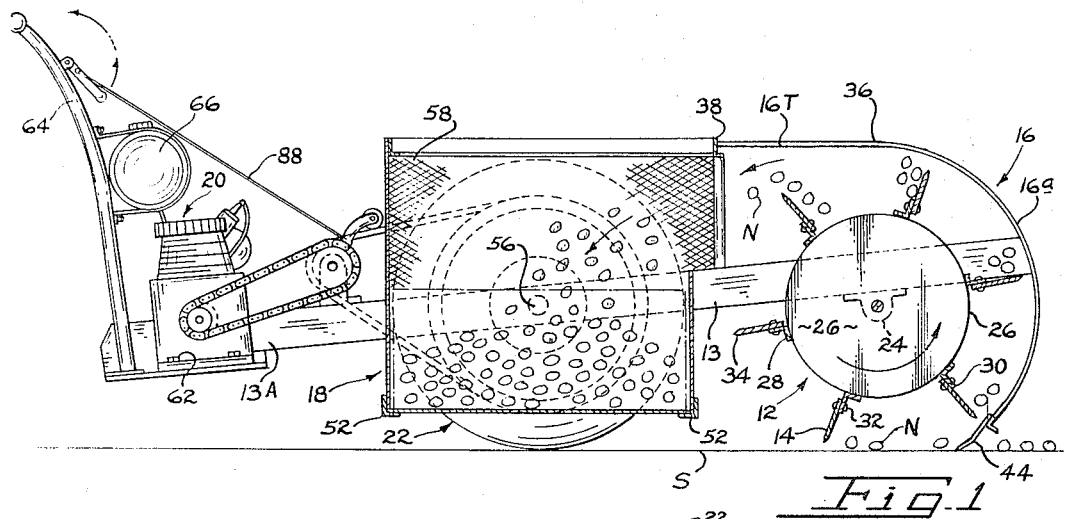
FIGURE 1 is a side elevation view of my nut gathering machine with certain portions broken away for clarity.

Referring more particularly to the drawings reference numeral 12 indicates a reel mounted on a frame 13 and having a plurality of nut impelling blades 14 thereon for moving nuts N upwardly from a ground surface S. A generally arcuate housing 16 is provided for containing the nuts and guiding them upwardly and rearwardly to a nut receiving receptacle 18 disposed rearwardly of housing 16. An engine 20 for powering the apparatus is mounted on the rear of the apparatus and serves to counterbalance the machine with respect to centrally disposed wheels 22.

Reel 12 includes a shaft 24 suitably journaled on frame 13. Secured to shaft 24 for rotation therewith are a plurality of spaced apart circular disks 26 about the periphery of which are affixed a plurality of spaced apart angle irons or the like 28. The showing in FIGURE 1 of a reel having 6 angle irons 28 is exemplary and is not to be deemed critical or limiting. Each angle iron 28 has a radially extending leg 30 to which is secured a nut impelling blade 14. I prefer to secure blades 14 to angle irons 28 by providing each with a row of aligned holes and installing rivets or the like 32 through the holes.

Figure 4:
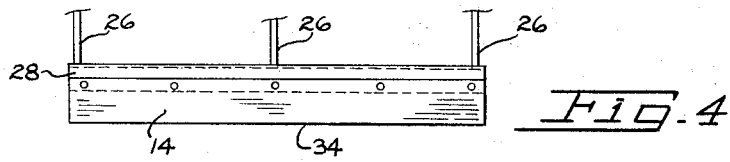
FIGURE 4 is a view taken substantially along line 4—4 of FIGURE 1 showing one form of nut impelling blade used in my apparatus.
Figure 5:
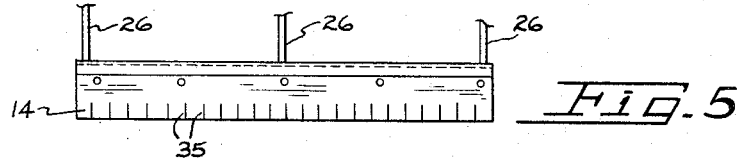
FIGURE 5 is a view similar to FIGURE 4 and showing a modification of my nut impelling blade.
Figure 6:
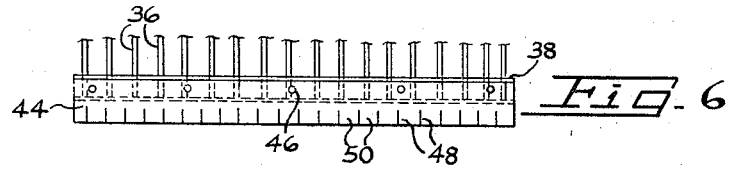
FIGURE 6 is a view taken substantially along line 6—6 showing a ground surface engaging resilient member mounted at the forward end of my apparatus.

Blades 14 are preferably resilient and can be made for example of rubber coated fabric material of the type used for flat, power transmitting belts. The radial extremity or edge 34 of each blade 14 is equidistantly spaced from shaft 24 so that the edges travel in a cylindric path with respect to shaft 24. As the machine is operated over a ground surface the hypothetical cylindric surface described by edges 34 is approximately tangent to the ground surface S. Blades 14 can be solid, FIGURE 4, or can be slitted as at 35, FIGURE 5, depending primarily on the degree of flexibility of the material of which the blades are constructed.

Housing or cage 16 is suitably mounted to frame 13 and defines a nut impervious surface to permit upward and rearward conveyance of nuts by blades 14. I prefer to form cages 16 from a plurality of parallelly spaced apart rods 36 which are formed in a generally J-shaped configuration as shown most clearly in FIGURE 1. Rods 36 are secured in place by welding or the like to angle members 38 which transversely span a pair of J-shaped structural members 40 secured to frame 13. The spacing between adjacent rods 36 is less than the diameter of nuts N but is large enough to permit expulsion by centrifugal force of unwanted leaves, twigs, stones and the like between adjacent bars.

Rods 36 terminate along a lower edge 42, which edge is parallel to ground surface S and spaced therefrom by an amount greater than the diameter of nuts N so as to admit the nuts behind housing 16. Extending downwardly and rearwardly from edge 42 is a resilient strip 44 which strip contacts ground surface S or alternatively is spaced thereabove by an amount less than the diameter of nuts N. I prefer to secure resilient strip 44 to cage 16 by rivets or the like 46 installed through aligned holes in the resilient strip and lower angle member 38 of the cage. Resilient strip 44 is preferably constructed of rubber coated fabric material such as used in power transmission belts and can be provided with slits 48 extending from the lower surface of the strip approximately halfway up strip. It will be seen that adjacent slits 48 define a finger 50. Fingers 50 and resilient strip 44 contribute to the function of the resilient strip of admitting nuts to the rear of cage 16 as the apparatus is moved on ground surface S while preventing expulsion of nuts beneath the cage by the forward movement of blades 14.

Cage 16 includes an arcuate portion 16a and terminates at the upper extremity of the cage in a tangentially rearwardly extending surface defining portion 16T. As is most clearly shown in FIGURE 1, tangential portion 16T guides nuts N rearwardly and permits discharge of the nuts as blades 14 move downwardly.

To the rear and below tangential cage portion 16T are provisions for supporting receptacle 18 in the apparatus; frame members 52 are mounted to main frame 13 for this purpose. I prefer to form receptacle 18 by providing two substantially identical boxes 18A and 18B placed in juxtaposition between opposite main frame members 13. Thus each box can be individually removed when it is full of nuts.

The receptacle supporting frame defined by frame members 52 is entirely unobstructed from the top of the apparatus. Such unobstructed condition is afforded by provision of stub axles 56 for mounting wheels 22 to main frame members 13. Since the axles extend no further inwardly than main frame members 13, boxes 18A and 18B can be readily lifted out. Such form of construction permits receptacle 18 to be positioned well below the axis of stub axles 56, as a result of which the balance of the apparatus with respect to wheels 22 is not materially altered by nuts in boxes 18. Nut impervious panels 58 are mounted on the frame for guiding the nuts into boxes 18A and 18B.

The above described disposition of wheels 22 places the wheels outside of the swath of the reel 12 as a consequence of which the tires run over nuts lying on the ground. I have provided wheels 22 with tires larger than conventional design practice would dictate so that the tires can be operated at very low pressure. The pressure is sufficiently low so that the tire surface will yield when a nut is encountered rather than depressing the nut into the ground surface. Because oversized low pressure tire are used sufficient traction can be had even with smooth tires, which characteristic further enhances the ability of the tires to run over nuts without depressing the nuts into the ground surface.

Extending rearwardly from main frame members 13 is an engine supporting frame 13A. Affixed to frame structure 13A is a plate 60 to which engine 20 is suitably secured, such as by machine bolts 62. Extending upwardly from frame structure 13A is a handle bar assembly 64 by which assembly the operator of the machine controls its operation. A gas tank 66 can be mounted on handle bar assembly 64 for supplying fuel to engine 20.

Figure 2:
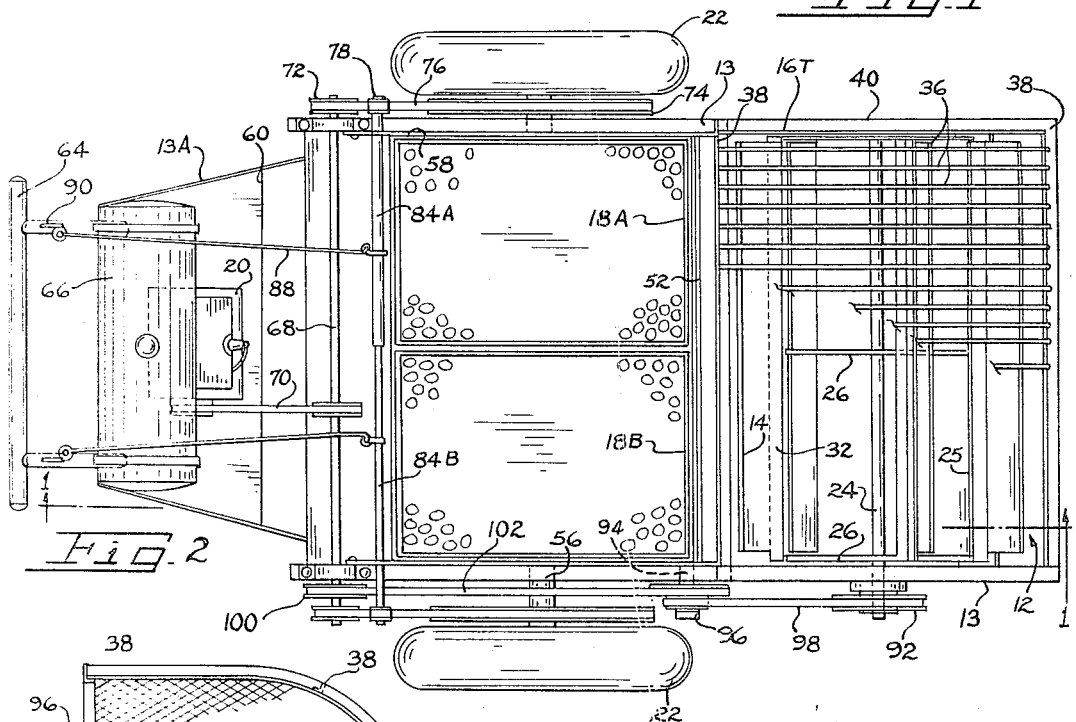
FIGURE 2 is a top plan view of the machine of my invention with portions broken away to reveal interior details thereof.
Figure 3:
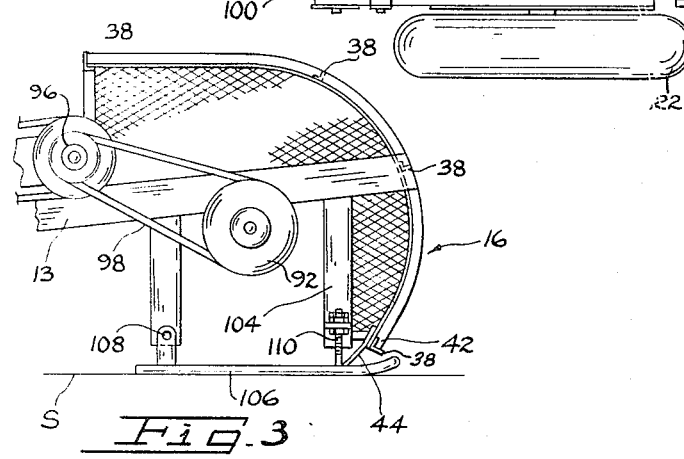
FIGURE 3 is a partial side elevation view showing a preferred structure for adjusting the height of the apparatus.
Figure 7A:
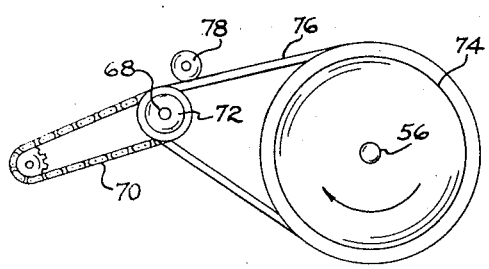
FIGURES 7A and 7B are schematic views of a power train for providing locomotion to the apparatus, FIGURE 7A showing the power train disengaged and FIGURE 7B showing the power train engaged.
Figure 7B:
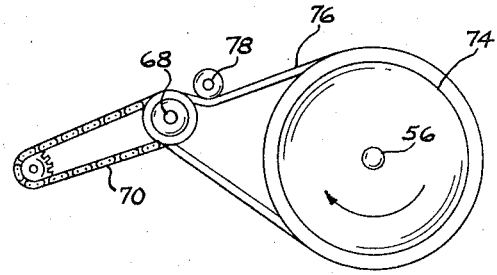

A counter shaft 68 is journaled to main frame 13 transversely thereof and is driven by engine 20 through a conventional chain drive 70. Each wheel 22 is individually and controllably driven from counter shaft 68 as can be seen in FIGURES 2, 7A and 7B. Since each wheel is driven and controlled in the same manner, the power train with respect to only one wheel will be described, it being understood that the power train to the other wheel is identical. To the outer end of counter shaft 68 is affixed a pulley 72. In alignment with pulley 72 and secured to wheel 22 is a second pulley 74. A conventional V-belt or the like 76 is mounted on pulley 72 and 74 for conveying power from the former to the latter. Idler pulley 78 is also provided for engagement with belt 76, the idler pulley being supported on an arm 80 that is pivotly mounted on a bearing member 82 extending upwardly from main frame 13. Also supported in bearing member 82 and secured to arm 80 to effect pivotal movement thereof is a control shaft 84A which is supported at the transverse center of the apparatus by telescoping with a control shaft 84B active in controlling the other wheel 22. Secured to control shaft 84A inwardly of main frame 13 is a crank arm 86 which is apertured at the free end thereof to receive one end of a control rod 88, the opposite end of which is mounted to a lever 90 secured on one side of handle bar assembly 64. Lever 90 is a conventional expedient of the type that causes reciprocating movement of control rod 88 when the lever is pivotally moved.

Referring now to FIGURE 7A the power train is shown in a neutral or disengaged position in which position no power is supplied to pulley 74 and wheel 22. In such position idler pulley 78 is rendered ineffective to tension belt 76 by reciprocation of rod 88 toward the left as viewed in FIGURES 1 and 2. When it is desired to apply power to wheel 22, lever 90 is pivoted to cause crank arm 86 and pivot arm 80 to move in a clockwise direction as viewed in FIGURE 1. As shown in FIGURE 7B, idler pulley 78 thereby tensions belt 76 as a consequence of which power is transmitted from counter shaft 68 to pulley 74 and wheel 22.

Because the transmission of power to each wheel 22 is independently controlled, the apparatus can be readily steered by the operator and can, in fact, be made to turn in a circle of a radius substantially equal to the width of the apparatus.

Figure 8:
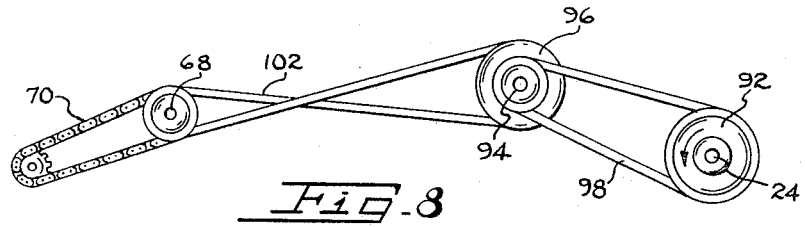
FIGURE 8 is a schematic view of the power train for driving the nut impelling blades.
Figure 9:
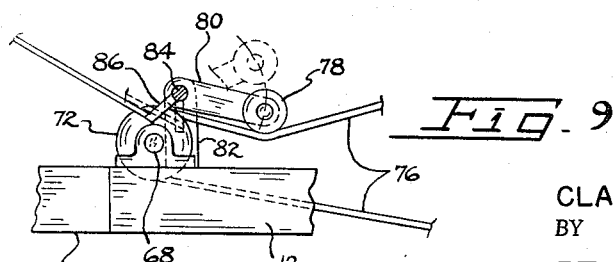
FIGURE 9 is an enlarged partial view of a device for controlling power to the wheels.

Referring now to FIGURE 8, shaft 24 of reel 12 has mounted thereon a driven pulley 92. Rearwardly of shaft 24 is a jack shaft 94 for mounting a cone pulley 96 to main frame 13. A cone pulley is preferred to allow adjustment of the rotative speed of reel 12. A belt 98 extends from driven pulley 92 to cone pulley 96 for transmitting power from the latter to the former. Cone pulley 96 is driven from a pulley 100 mounted on counter shaft 68 through a conventional V-belt or the like 102. It will be noted that belt 102 is crossed so as to drive reel 12 in a counter clockwise direction as viewed in FIGURE 1, that is to say, to move blades 14 forwardly at the lower portion of their path of travel and upwardly within the forward portion of cage 16.

For adjusting the spacing between cage 16 and ground surface S, I employ on the forward end of main frame 13 a pair of rigid depending frame extensions 104 for supporting a pair of skid runners 106. Each skid runner 106 is pivotally mounted at its rearward end 108 and adjustably mounted by a suitable threaded locking device 110 at its forward end. Thus adjustment of threaded locking device 110 moves cage 16 and blades 14 toward and away from the ground surface to compensate for varying nut sizes and variations in the degree of smoothness on ground surface S.

The operation of my invention is as follows: With skid runner 106 suitably adjusted and boxes 18A and 18B in place, engine 20 is started. Reel 16 thus is rotatably driven in a counterclockwise sense as viewed in FIGURE 1. Levers 90 are pivoted to transmit power to wheels 22 and the apparatus is driven across ground surface S. As nuts are encountered on the ground surface, resilient strip 44 yields to permit the apparatus to move over the nuts so as to admit the nuts to the rear of cage 16. At the rear of cage 16 the nuts are impelled by blades 14 and moved forwardly and upwardly along the interior of arcuate cage surface 16A. Since the arcuate cage surface is spaced from edges 34 of blades 14 by an amount less than the diameter of nuts N, the nuts are transported upwardly within the cage. Any small twigs and like refuse are expelled through the spaces between rods 36 by centrifugal force as the nuts are so transported. When the nuts arrive at the upper portion of cage 16, tangential surface portion 16T permits the nuts to move outwardly and away from blades 14. The momentum imparted to the nuts causes them to be discharged from the cage into boxes 18A and 18B. The rearward slope of resilient strip 44 and the proximity of its lower edge to the ground surface combine to cause the strip to act as a gate in that it prevents egress of nuts from under the forward edge of the cage when the nuts are contacted by forwardly moving blades 14 while permitting the nuts to pass beneath the cage.

One machine built in accordance with my invention has a length of about 80 inches, a width of about 62 inches and a total weight of approximately 250 pounds. Such machine is adequately powered by four horsepower gasoline engine. In such machine receptacle 18 has a capacity of approximately six bushels. Such exemplary machine, even when fully loaded with walnuts, is easy to control since boxes 18A and 18B are mounted symmetrically with respect to the axis of axle 56. The machine is sufficiently light in weight and adequately balanced with respect to wheels 22 that, irrespective of the quantity of nuts in receptacle 18, reel 12 and cage 16 can be lifted from the ground by downward force on handle bar assembly 64. Such action is desirable in traversing leafy areas and in transporting the machine from tree to tree.

Thus it will be seen that I have provided an extremely simple, lightweight, and versatile nut gathering machine which is relatively inexpensive to construct and which can be rapidly maneuvered over a ground surface. Although its total nut capacity is small compared with prior art machines with which I am familiar, I have found that its lightness and maneuverability more than compensate in terms of total production for the relatively smaller capacity.

While one embodiment of my invention has been shown and described it will be obvious that other adaptations and modifications may be made without departing from the true spirit and scope of the invention.

I claim:

1. Apparatus for gathering nuts from a ground surface comprising a frame including two spaced apart side members, a pair of wheels mounted longitudinally centrally of said frame for affording movement thereof on the ground surface, a nut impervious refuse pervious cage spanning said frame side members at the forward extremity of said frame, said cage defining a rearwardly concave arcuate nut guiding surface which surface terminates at a distance above the ground surface in excess of the diameter of the nuts for defining an input end, at least one blade driven concentrically with said arcuate surface for moving nuts upwardly on said arcuate surface, a resilient strip extending downwardly and rearwardly from said cage for affording ingress of nuts thereunder in response to movement of the apparatus on the ground surface and for preventing egress of nuts in response to movement of said blade, said cage terminating at the upper end thereof in a rearwardly tangentially extending portion for defining a discharge guide surface, and a receptacle disposed rearwardly beneath said discharge guide for receiving nuts therefrom, said receptacle being disposed longitudinally symmetrically with respect to said wheels to render the balance of the apparatus independent of the weight of nuts in said receptacle.

2. Apparatus according to claim 1 including an engine mounted on said frame and spaced rearwardly of said wheels by an amount sufficient to substantially counterbalance the weight of said cage, means for transmitting power from said engine to said blade, and means for selectively transmitting power from said engine to each of said wheels.

3. Apparatus for gathering nuts from a ground surface comprising a frame including a pair of parallel spaced apart structural members, a pair of wheels mounted on said frame for rotation about an axis substantially longitudinally centrally of said structural members to support the frame for movement over the ground surface, an elongate blade mounted for rotative movement upon an axis proximate the forward portion of frame members and along a cylindric path approximately tangent to the ground surface, a cage including a plurality of spaced apart bars mounted on the forward extremity of said frame members and extending arcuately and concentric to the path of blade movement from a line parallel to the ground surface to a point vertically above the axis of rotation of said blade, adjacent said bars being spaced from one another by an amount sufficient to contain nuts within said cage and being spaced apart to afford radial egress of refuse from said cage, said bars extending tangentially from said point rearwardly therefrom, a receptacle intermediate said frame members in nut receiving relation to said tangential bar portions, said receptacle being formed substantially symmetrically of the axis of rotation of said wheels, and means for rotatively driving said blade to move nuts upwardly within the bar structure for deposit in said receptacle.

4. Apparatus for gathering nuts from a ground surface comprising a frame, a pair of wheels journaled centrally of said frame for affording movement thereof over the ground surface, a reel mounted on the forward end of said frame, said reel including a plurality of nut impelling blades mounted for rotation about an axis and being radially equi-spaced from said axis, means depending from said frame for spacing said blades in approximate tangential relation to the ground surface, a cage mounted on said frame having an arcuate surface concentric with the path of blade travel which arcuate portion is spaced from said blades by an amount less than the diameter of the nuts, said arcuate surface terminating in an edge spaced above the ground surface by an amount sufficient to admit nuts thereunder, a resilient member extending downwardly and rearwardly from said edge, said resilient member being rearwardly yieldable to admit nuts rearwardly thereof and sufficiently rigid to guide nuts impelled by said blades upwardly in said cage, an engine mounted on said frame and spaced rearwardly of said wheels by an amount sufficient to substantially counterbalance said cage and reel with respect to said wheels, means for establishing a driving connection from said engine to said reel, and a nut receptacle supported in said frame symmetrically with respect to said wheels, said cage including means for guiding nuts from said arcuate surface to said receptacle.

References Cited by the Examiner

UNITED STATES PATENTS 3,102,647  9/1963  Bonney _____ 56—328 X
3,131,526  5/1964  Burnham _____ 56—328
3,193,998  7/1965  Fredriks _____ 56—328

ABRAHAM G. STONE, Primary Examiner.
RUSSELL R. KINSEY, Examiner.